(No Model.)
V. S. BROCK.
MEAT TENDERER.
No. 302,381. Patented July 22, 1884.
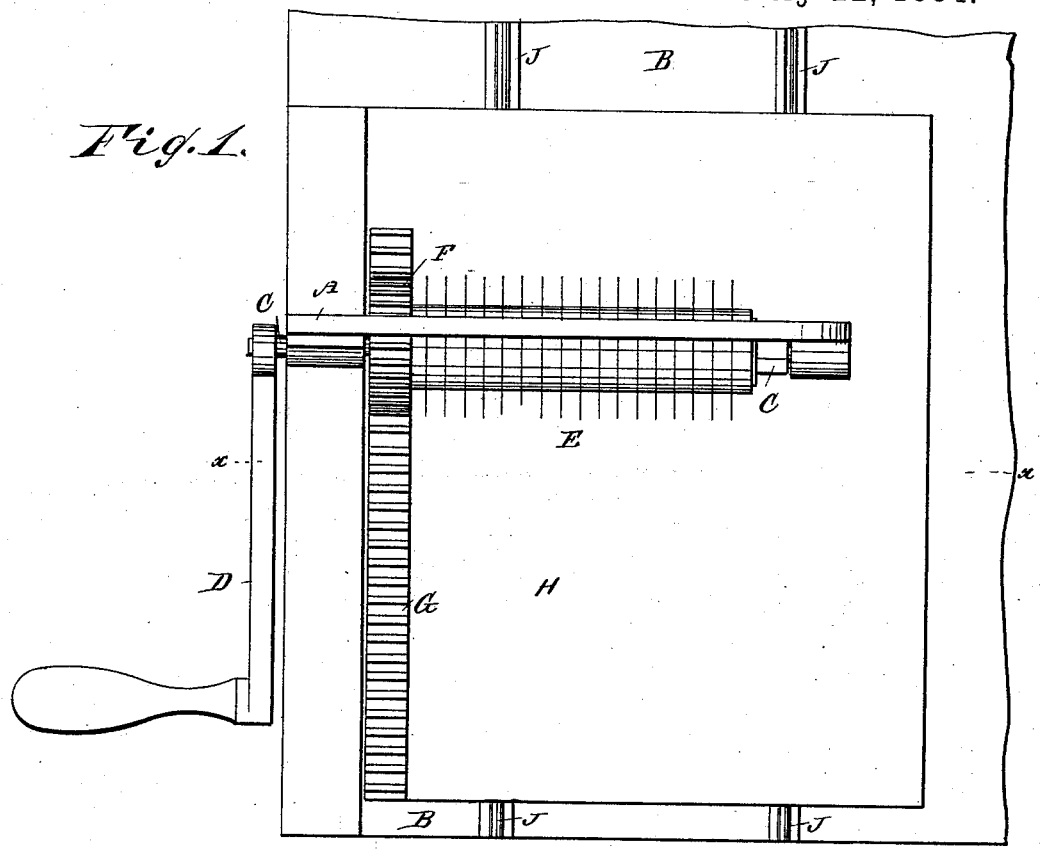
Fig. 1.
Fig. 3.
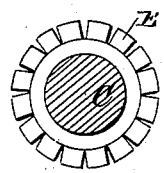
Fig. 2.
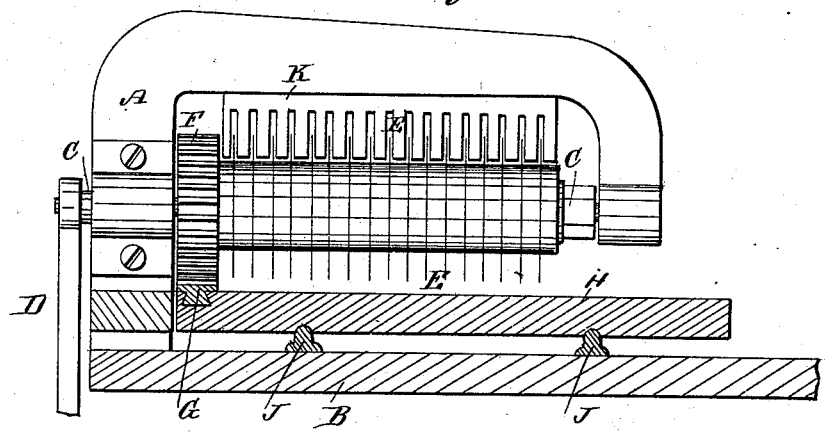
WITNESSES:
Theo. G. Hoster
C. Sedgwick
INVENTOR:
V. S. Brock
BY Munn & Co
ATTORNEYS.

UNITED STATES PATENT OFFICE.

VIRGIL S. BROCK, OF OSCEOLA, ARKANSAS.

MEAT-TENDERER.

SPECIFICATION forming part of Letters Patent No. 302,381, dated July 22, 1884.

Application filed September 19, 1883. (No model.)

*To all whom it may concern:*

Be it known that I, VIRGIL S. BROCK, of Osceola, in the county of Mississippi and State of Arkansas, have invented a new and Improved Meat-Tenderer, of which the following is a full, clear, and exact description.

The object of my invention is to provide a new and improved device for rendering meat tender, juicy, and palatable.

My invention relates to certain improvements in that class of meat-tenderers in which the cog on the shaft carrying the fluted roller engages with a rack on the sliding bed-plate having projections on its surface; and it consists in certain details of construction, as will be hereinafter fully described and claimed.

Reference is to be had to the accompanying drawings, forming part of this specification, in which similar letters of reference indicate corresponding parts in all the figures.

Figure 1 is a plan view of my improved meat-tenderer. Fig. 2 is a cross-sectional elevation of the same on the line $xx$, Fig. 1. Fig. 3 is a cross-sectional elevation of the shaft and side view of one of the knives.

A bracket-standard, A, is secured on a base, B, and in the said bracket-standard a horizontal shaft, C, is journaled, which is provided at one end with a suitable crank-handle, D. On the shaft C a series of circular toothed knives or cutters, E, are mounted, and are spaced equidistant. A pinion, F, is also mounted on one end of the shaft C, and engages with a rack, G, secured in some suitable manner on a platform, H, resting on tracks J on the base B, on which tracks the platform can slide. The top of the platform is such a distance from the periphery of the knives or cutters E that the said cutters cannot cut entirely through the meat placed on the platform, but can cut into the meat. A comb, K, is secured to the bottom of the bracket-arm, the prongs of the said comb projecting between the cutters or blades for removing from the same particles of flesh, &c., that adhere to the said cutters. The steak or other meat that is to be tendered is placed on the platform H, and the shaft C is revolved by means of the handle D. The platform H will be moved under the shaft, and the cutters E will be pressed into the meat as it passes under the shaft, and thereby the fibers will be cut and bruised or crushed and the meat will be rendered tender and juicy.

The base may be provided with suitable devices for holding it on a kitchen-table, &c.

If desired, the platform can be raised sufficiently to cause the cutters to cut through the meat.

I am aware that rotary cutting-disks are not new, and that such have been provided with a comb or clearer-plate, and I do not desire to claim such, broadly, as of my invention.

Having thus described my invention, I claim as new and desire to secure by Letters Patent—

The combination, with the base B, provided with the tracks J, of the sliding platform H, having a rack, G, near one edge thereof, a curved standard extending across the machine, the shaft C, journaled thereon, the said shaft being provided with a series of cutting-disks, and a gear-wheel, F, for engaging the rack G, and a comb or clearer-plate mounted on the standard above the cutting-disks, substantially as set forth.

VIRGIL S. BROCK.

Witnesses:
M. H. FLETCHER,
C. H. GAYLORD.